United States Patent [19]

Jones et al.

[11] Patent Number: 4,547,468

[45] Date of Patent: Oct. 15, 1985

[54] HOLLOW PROPPANTS AND A PROCESS FOR THEIR MANUFACTURE

[75] Inventors: Arfon H. Jones; Raymond A. Cutler, both of Salt Lake City, Utah

[73] Assignee: Terra Tek, Inc., Salt Lake City, Utah

[21] Appl. No.: 509,991

[22] Filed: Jun. 30, 1983

Related U.S. Application Data

[63] Continuation-in-part of Ser. No. 291,257, Aug. 10, 1981, abandoned.

[51] Int. Cl.$^4$ ............................................... C03C 3/22
[52] U.S. Cl. ................................ 501/33; 252/8.5 LC; 166/280; 501/85
[58] Field of Search ................... 501/33, 85; 166/280; 252/8.5 LC

[56] References Cited

U.S. PATENT DOCUMENTS

| | | | |
|---|---|---|---|
| 3,399,727 | 9/1968 | Graham et al. | 252/8.55 R |
| 3,975,194 | 8/1976 | Farnand et al. | 75/222 |
| 4,072,193 | 2/1978 | Sarda et al. | 166/280 |
| 4,106,574 | 8/1978 | Dow | 175/4.57 |
| 4,109,717 | 8/1978 | Cooke, Jr. | 166/250 |
| 4,159,296 | 6/1979 | Florea et al. | 264/115 |
| 4,163,637 | 8/1979 | Hendricks | 425/6 |
| 4,391,646 | 7/1983 | Howell | 501/33 |
| 4,421,562 | 12/1983 | Sands | 106/75 |

OTHER PUBLICATIONS

Lightweight Proppants for Deep Gas-Well Stimulation First Annual Report Jul. 1979–Jul. 1980, by Jones, A. H., Cutler, R. A. and Swanson, S. R.
Lightweight Proppants for Deep Gas Well Stimulation Second Annual Report Jul. 1, 1980–Jun. 30, 1981 by Cutler, R. A. and Jones, A. H.
Lightweight Proppants for Deep Gas Well Stimulation Third Annual Report Jul. 1, 1981–Jun. 30, 1982 by Cutler, R. A., Enniss, D. O., Swartz, G. C. and Jones, A. H.
Lightweight Proppants for Deep Gas Well Stimulation Final Report Dec. 1983 by Cutler, R. A. and Jones, A. H., Ratsep, O., Johnson, D. L.
Copy of Contract and Modification for DE-AC1-9-79BC10038.
SPE/DOE 9869, New Proppants for Deep Gas Well Stimulation, Society of Petroleum Engineers, U.S. Department of Energy, by Cutler, R. A., Jones, A. H., Swanson, S. R., and Carroll H. B. Jr.
SPE/DOE, Comparison of the Fracture Conductivity of Commercially Available and Experimental Proppants at Intermediate and High Closure Stresses, Society of Petroleum Engineers, U.S. Department of Energy, by Cutler, R. A., Enniss, D. O., Jones, A. H., and Carroll, H. B.
Fracture Analysis of Ceramic Proppants, J. Energy Resources Technology, vol. 105, Jun. 2, 1983, pp. 128–133, by Swanson, S. R., and Cutler, R. A.
Fabrication and Fracture Conductivity Comparison of Ceramic Proppants by Cutler, R. A., Jones, A. H., Ennis, D. O. and Swanson, S. R.
Influence of Water Vapor on Crack Propagation in Soda–Lime Glass, J. Am. Ceram. Soc., vol. 50, No. 9, pp. 407–414, (1967) by Wiederhorn, S. M.

*Primary Examiner*—John Doll
*Assistant Examiner*—Jackson Leeds
*Attorney, Agent, or Firm*—M. Reid Russell

[57] ABSTRACT

Hollow, fine-grained ceramic proppants are less expensive and improve fracture control when compared to conventional proppants (dense alumina, mullite, bauxite, zirconia, etc.). Hollow proppants of the present invention have been fabricated by spray drying, followed by sintering in order to obtain a dense case and a hollow core. These proppants generally have high sphericity and roundness (Krumbein sphericity and roundness greater than 0.8), have diameters on average between 2250 and 125 μm, depending on proppant size required, and have strength equal to or greater than that of sand. The hollow core, the size of which can be controlled, permits better fracture control in hydraulic fracturing treatments since the proppant can be transported in lower viscosity fluids. Hollow proppants produced at the same cost/weight as conventional proppants also provide for lower costs, since less weight is required to fill the same volume. The fine-grained (preferably less than 5 μm in diameter) ceramic case provides the strength necessary to withstand closure stresses and prevent crushing.

17 Claims, 6 Drawing Figures

HOLLOW PROPPANTS AND A PROCESS FOR THEIR MANUFACTURE

The government has rights in this invention pursuant to contract 110 DE-AC 19-79 BC 10038 awarded by the U.S. Department of Energy.

RELATED APPLICATION

The present application is a continuation-in-part of a patent application Ser. No. 291,257 filed Aug. 10, 1981, now abandoned.

DESCRIPTION OF THE INVENTION

1. Background

Beginning in this country in approximately 1932, greater and greater efforts have been made to increase the flow of gas and oil from existing wells by a number of stimulation techniques. Such efforts have involved explosives and procedures such as acidizing wells that entail an introduction of a fluid under pressure into a well that would chemically react with a reservoir formation to stimulate the flow of gas or oil. In the past and up to today, a current and most often used well-stimulation technique has involved injection of a fluid, typically water-based, under pressure, to hydraulically fracture a reservoir formation. Early on in the development of hydraulic fracturing techniques, it was realized that without injecting a material into the cracked fractures to "prop" open those fractures, they would tend to close, losing benefit of the fracture. With this recognition, a number of different types of proppant materials and configurations have been developed to include: nutshells, plastics, steelshot, aluminum beads, high-strength glass, in addition to the most commonly used material, sand. By and large, sand has proven to be the most practical proppant material considering both its availability and cost. Experience has, however, taught that only high-grade sand, e.g., St. Peters (Ottawa silica sand) or Brady sand, are acceptable for high compressive stress uses, though current shortages of such high-grade sand have necessitated the use of lower-grade sands.

With an industry trend of undertaking massive hydraulic fracturing at deeper depths, particularly at formation depths in excess of 7,000 feet, the likelihood of proppant crushing has increased. Therefore, more and more consideration is being given to proppant structure than has heretofore been required. With the loss of permeability of sand packs at depths below 7,000 feet due to proppant crushing sintered bauxite, though more expensive, has found increasing use in propping deep hydraulic fractures where a high strength proppant is necessary to achieve the high permeability fractures. Additional to the cost of a pound of bauxite being approximately 10-15 times greater than that of Ottawa sand, solid sintered bauxite proppants are significantly heavier, having a density of approximately 3.6 grams per cubic centimeter as compared to a sand density of approximately 2.7 grams per cubic centimeter. The increased specific gravity of bauxite as compared to sand not only increases the cost on a volume basis, but also necessitates an increase in the fracturing fluid viscosity and/or pumping rate in order to provide efficient proppant transport. The present invention recognizes the need for a high-strength, low-specific gravity proppant for improving fracture control and supporting the formed fractures for deep wells, and it is this need that the hollow proppant of the present invention was developed to meet.

2. Field

This invention relates to proppants for use during fracturing of subterranean formations surrounding gas wells, oil wells and similar boreholes. More particularly, the invention relates to low specific gravity hollow propping agents and process for their construction.

3. Prior Art

Hydraulic fracturing is used to increase the productivity of gas wells in low permeability reservoirs by creating deeply penetrating fractures in the producing formation surrounding the well. The fracture is created by pumping a viscous fluid through perforations in the well casing or in the uncased section of the well. A specially screened, high purity silica sand has traditionally been mixed with the hydraulic fluid being pumped to create a fracture. The sand props open the fracture and after the hydraulic pressure is released, the fluid flows back into the well. The relatively low cost, abundance, sphericity and low specific gravity of high quality sands (i.e., Ottawa or Brady silica sands) have made such sands a good proppant for most hydraulic fracturing treatments. However, closure stress on proppants increases with depth, and even high quality sands have been found to be ineffective proppants when closure stresses exceed approximately 55 MPa (8,000 psi). Above 55 MPa, the sand grains crush and the resulting fines plug the proppants pack.

Several proppants have been developed to withstand the increased closure stress of deeper wells. Sintered bauxite, fused zirconia, and resin-coated sand have been the most successful higher strength proppants recently introduced. The higher cost of these materials, as compared to sand, has been the largest single factor inhibiting their widespread use. The cost of proppants should be compared on a volume rather than a weight basis, since the same volume of proppant should be pumped regardless of the specific gravity of the proppant. This means that, although bauxite is roughly twelve times more expensive than sand when equal weights are compared, it is approximately sixteen times more expensive if equal volumes are compared.

In addition, lower specific gravity proppants are not only more cost-effective, but also have the potential to improve proppant transport. The effect of proppant diameter on settling velocity in non-Newtonian fluids has been shown, and it has been concluded that proppant settling may determine the success or failure of a hydraulic fracturing treatment. Further, proppant density also has an effect on settling velocity. The settling velocity of −20, +40 mesh proppants, having different specific gravities, is a function of fluid shear rate. The specific gravity of bauxite is 3.65 gm/cc, and of sand, 2.65 gm/cc, and therefore bauxite is 37.7% more dense than sand. The settling veloctiy for bauxite, however, will be approximately 65% higher than for the same diameter sand.

Proppants having specific gravities lower than bauxite are important since they improve the transport characteristics of the proppant during placement. It has been demonstrated that vertical propagation of the fracture can be limited by reducing the fracturing fluid pressure. The viscosity range of existing fracturing fluids make minimizing fluid viscosity a much more effective method of controlling pressure than lowering the pumping rate. A potential advantage of decreasing the specific gravity of the proppant is that identical proppant transport to that currently achievable can take place in lower viscosity fluids to also decrease costs, since the cost of the fracturing fluid generally decreases with viscosity.

Where several inventions have been made which provide for higher strength ceramic materials, such as sintered bauxite (Cooke, Jr. et al., U.S. Pat. No. 4,068,718) or alumina (Colpoys, Jr. et al., U.S. Pat. No. 3,976,138), to provide greater strength than sand, these materials are made to be as fully sintered as possible and, therefore, internal voids only occur due to defects introduced in processing.

The present invention, while it also teaches a spherical proppant, is distinct in that it provides a proppant having up to the same strength as the heavier solid particles of the Cooke patent, but is of lesser weight through a utilization of unique proppant geometry. Distinct from the present invention, other solid proppants and their uses are also taught in earlier patents (Claude E. Cooke, Jr., U.S. Pat. Nos. 3,888,311 and 3,998,271), that involve application of coatings, particularly resin coatings, to proppants, or like materials. In the case of U.S. Pat. No. 3,998,271, however, that resin application was to provide a coating that, upon contact with a heated brine, would polymerize and cure to bond the proppants together.

Hollow glass beads for use as lightweight filler materials have been made by melting a glass composition and using a blowing agent to produce a central void (Veatch et al., U.S. Pat. No. 3,030,215 and Schott, U.S. Pat. No. 4,113,915). Such hollow spheres are, however, not acceptable propping agents as they are susceptible to stress corrosion cracking in aqueous solutions, do not withstand crushing at closure stresses above 34.5 MPa, (5,000 psi), and have been shown in studies to be ineffective propping agents.

While it is true that hollow ceramic microspheres can be made as by following the invention of Beck, (U.S. Pat. No. 4,111,713), application of this technology with alumina has shown that grain sizes must be greater than 50 $\mu$m in diameter to avoid particle agglomeration as occurred when small grain sizes were used. Large grain sizes and large agglomerates (50-150 $\mu$m in diameter) contribute to low strength, and test proppants had much lower strength than sand. In addition, the decomposable resin core used in making these proppants makes the processing costs several times more expensive than sintered bauxite and, therefore, an uneconomical alternative to bauxite. The Beck reference does not propose a use of the spheres as hollow proppants, nor are there any other references, prior to the present invention, to a use of hollow crystalline ceramic spheres as propping agents.

Some other examples of U.S. patents that have involved different utilizations and configurations of proppants are shown in patents by Slussin, (U.S. Pat. No. 4,109,721); Hussing, (U.S. Pat. No. 4,156,464); and a patent by Perkins, (U.S. Pat. No. 4,029,149).

In recognition of the utility of using ceramic proppants for hydraulic fracturing, the present invention provides a hollow ceramic proppant and process for its manufacture where the proppant will have a crush resistance equal to or greater than that of sand.

BRIEF SUMMARY AND OBJECT OF THE INVENTION

It is, therefore, a primary object of the invention to provide a hollow, crystalline ceramic proppant with a specific gravity below 3.3 gm/cc and a crushing strength equal to or greater than that of sand at closure stresses above 34.5 MPa (or 5,000 psi), which corresponds to a depth of greater than 7,000 ft (if a 0.7 psi/ft fracture gradient is assumed).

An additional object of the invention is to provide a process for producing the hollow ceramic proppant by spray drying.

An additional object of the present invention is to produce proppants that are hollow spheres, each having an internal void that is greater than 5 percent of the proppant volume, has a diameter approximately between 125 and 2250 $\mu$m ($-$100 mesh, $+$8 mesh), has a high degree of sphericity of greater than 0.8 Krumbein roundness, that is able to resist strength degradation in 2 percent KCl at temperatures to 200° C.

In accordance with the above objects, the present invention relates to hollow crystalline ceramic proppants and a process for producing them. The ceramic proppant will have an internal void that occupies greater than 5 volume percent of the proppants, and will occupy a space within the proppant that is as concentric as possible with the outside spherical surface. The ceramic material may be alumina, bauxite, mullite, cordierite, silicon carbide, zirconia or other similar crystalline ceramic materials that exhibits stability in brine solutions at temperatures to 200° C. The grain size of the proppant outside wall should be as small as possible, preferably below 5 $\mu$m in diameter, with a wall thickness that is large enough that the strength of the proppant will be equal to or greater than the strength of the same volume of high quality sand.

Hollow proppants of the invention are made from a fine ceramic powder that is preferably produced by dry milling or a like process, which is then well dispersed in an aqueous slurry. The slurry is pumped through a nozzle into a spray dryer and the spray drying parameters, thereof, are controlled in order to make hollow spheres, preferably in the 600-1000 $\mu$m diameter range. The ceramic spheres are then sintered in air at an appropriate temperature so as to retain the small grain size, with a permitted shrinkage in the 125-2250 $\mu$m in diameter range, preferably in the 400-800 $\mu$m range.

These and other objects and features of the present invention will become more fully apparent from the following description and appended claims.

DESCRIPTION OF THE DRAWINGS

The drawings illustrate that which is presently regarded as the best mode for carrying out the invention.

DETAILED DESCRIPTION OF THE PREFERRED EMBODIMENTS

Reference is hereby made to the drawings that illustrate that which is presently regarded as the best mode for carrying out the invention.

Figure 1:
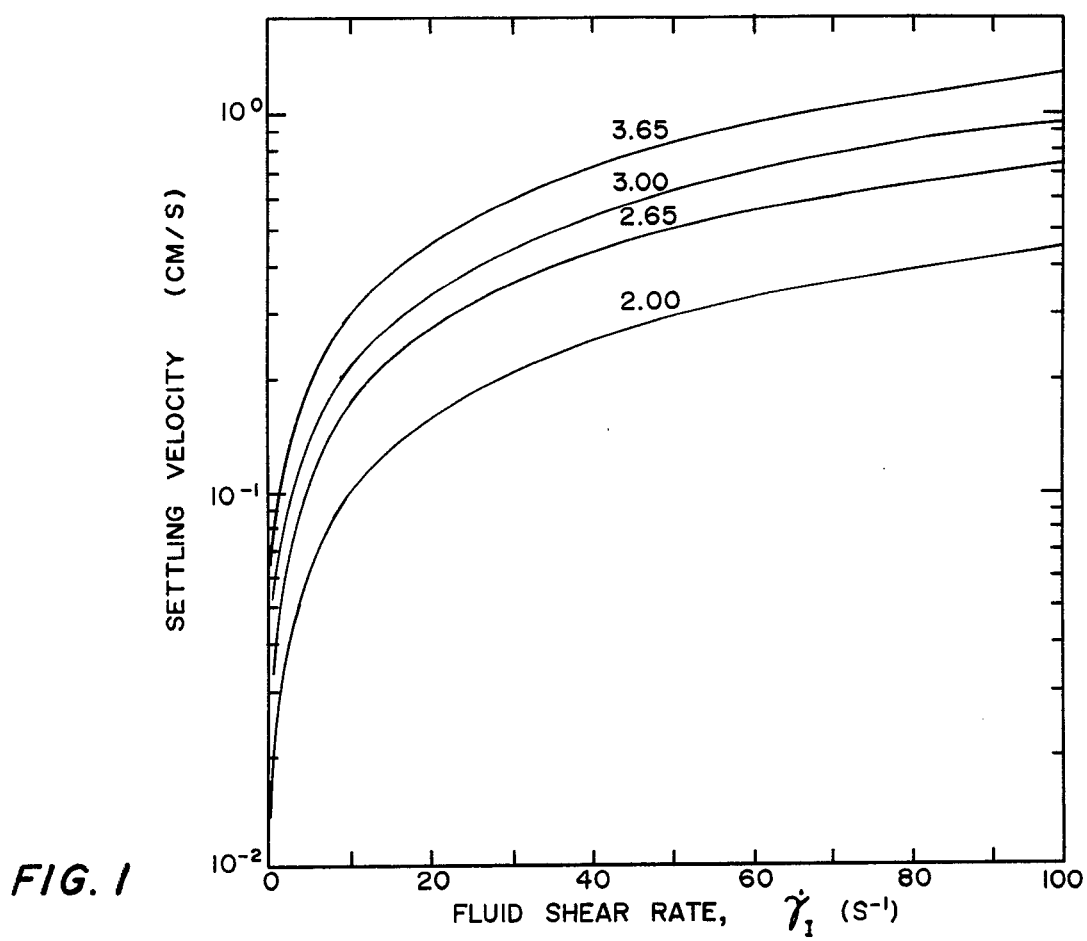
FIG. 1, is a graphical representation showing the effect of proppant density on settling velocity for spheres with specific gravities in gm/cc of 2.00, 2.65, 3.00 and 3.60.

As a developmental step, a theoretical model was formulated to show that a packed bed of hollow proppants will provide sufficient support strength for a deep well fracture. As shown in FIG. 1, assuming a typical −20, +40 mesh proppant (with an average diameter of 0.07 cm), in a non-Newtonian fluid (n=0.35 and K=9.0 poises of density 1.1 g/cc) for use in a 0.250 cm wide fracture, such hollow proppants will provide better fracture conrol because they settle slower due to their lower density. A three-dimensional close-packed array of spherical particles was assumed for the theoretical model. In practice, it was shown that due to the much larger compressive strength of ceramic materials as compared to tensile strength, fracture will initiate due to tensile stresses at the edge of the contact zone between particles. For solid spheres, a critically stressed volume will initiate fracture due to these tensile stresses. For hollow spheres, failure may be due to the bending of the wall during loading. In the model, these stresses were calculated using an elastic solution for a concentrated The stress at the inner surface is critical. This stress is calculated by:

$$\frac{\sigma}{P} = 1.243 \left( \frac{1}{1 - 2\xi - \xi^2} \right) \ln \left\{ \frac{33.61}{(1-\xi)} \left[ \frac{2 + \xi^3}{1 - \xi^3} + .667 \right] \right\} \quad (A)$$

The fracture pressure, P, can be predicted by the following equation:

$$P = .805 \frac{\sigma_o}{\beta} \left[ \frac{10 v_o}{\pi r^3 (1 - \xi)} \right]^\alpha \frac{(1 - 2\xi + \xi^2)}{\ln \left\{ \frac{33.61}{(1-\xi)} \left[ \frac{2 + \xi^3}{1 - \xi^3} + .667 \right] \right\}} \quad (B)$$

where $\epsilon$ is the ratio of the inner central void to the radius of the proppant (r), $\sigma_o$ is the bend strength of the material, and $\beta$ is an empirical constant. From the above equation for hollow proppant and a similar approach for solid proppants, the failure pressure can be predicted based on literature values for bend strength and Young's modulus of a specific material. These theoretical values have shown in practice to be in excellent agreement with experimental fracture conductivity values that were determined from the obvious assumption that both proppant strength and modulus will be reduced as porosity of the proppant shpere is increased.

An analysis of different ceramic materials with respect to proppant geometry for producing a proppant of the strength and density required, involves an assumption that a loading condition within a fracture will generally be compressive along the planes of the fracture except at the lateral edges thereof. And, for fractures of more than a few layers thick there will be an equal contact between the proppants packed therein. Assuming a single diametrical contact loading $F_c$, the loading of proppant sphere can then be related to the overall microscopic stresses by equating the forces so the force equilibrium is obtained. An equation for contact force $F_c$ is therefore:

$$F_c = bP\pi r^2 \quad (1)$$

with

P, the closure stress, r, the radius of the proppant sphere, and b, a constant that depends on the packing geometry.

Assuming a close packing configuration "b" will be at or near ½ with the constant force, $F_c$ than equals:

$$F_c = \frac{P\pi r^2}{2} \quad (2)$$

As set out above, the stress field associated with diametral loading of solid spheres will consist largely of compressive interior stresses with a local stress field in the vicinity of each contact point. For solid ceramic spheres that are without surface flows, tensile fracture can be assumed and will initiate at the contact points. For brittle materials such as ceramics, the zone or area of greatest concern that will experience tensile stress failure is in the vicinity of the contact region. Therefore, for the preferred ceramic materials, it can be assumed the compressive strength thereof will be sufficiently larger than the material's tensile strength such that a fracture will initiate due to tensile stresses.

The region of the proppant of greatest interest for brittle materials is, of course, the zone that is shaped like a torus at the edge of the contact zone. Assuming such stress concentration, proppant strength $\sigma_t$ will equal:

$$\sigma_t = \frac{1 - 2v}{3} q_o \quad (3)$$

Where "$v$" is Poissen's ratio, and "$q_o$" is the maximum contact pressure as given by the equation:

$$q_o = \frac{3}{2} \frac{F_c}{\pi a^2} \quad (4)$$

In equation (4) the "a" is the radius of the contact zone, which radius depends on the force, elastic properties, and radius of the sphere "r" as determined from the equation $$a = \left( \frac{3(1 - v^2)}{4E} F_c r \right)^{\frac{1}{3}} \quad (5)$$

By substitution of equations (2), (4) and (5) into equation (3), the tensile stress can then be determined in terms of the applied pressure as:

$$\sigma_t = .2241 (1 - 2\nu) \left( \frac{E}{1 - \nu^2} \right)^{\frac{2}{3}} p^{\frac{1}{3}} \quad (6)$$

It is, of course, difficult to separate size effects from stress gradient effects as they occur together, and both effects are strongly present in proppant sphere where loading occurs at a small contact zone. The contact zone is, of course, only a small fracture of the sphere surface and therefore tensile stresses will be high only in the immediate vicinity of the edges of that contact region.

In practice, fracture stress has been found to depend on the degree of stress gradient, and a large size effect has been observed. Therefore, it has been determined that for equal probability of fracture, the apparent fracture stress will depend inversely on the stressed volume as:

$$\frac{\sigma}{\sigma_o} = \left( \frac{v_o}{v} \right)^\alpha \quad (7)$$

Where $\sigma_o$ and $V_o$ are a reference stress and volume, and $\alpha$ is a material parameter. Therefrom, since it can be assumed that both size and stress gradient effects will be strongly present in a multilayered proppant packing, and based on fracture test results on brittle rock, the critically stressed volume can be obtained in conjunction with equation (7) above by a multiplication of peak stress in this volume by an averaging numerical constant. This numerical constant $\beta$ will in effect be treated as an emperical constant to account for uncertainties in the overall analysis due to size and stress effects.

As set out hereinabove the critically stress volume can be assumed to be essentially a torus located at the edge of the contact zone. Therefore, from geometric scaling, the cross sectional area of the torus will depend on the radius of the contact zone and can be assumed to be approximately 0.08a. The resulting critically stressed volume is therefore given by the equation:

$$v = N \pi/4 (0.08a)^2 2\pi a \quad (8)$$

With N the number of contact points of between layers of proppants and for this devivation can be assumed to be twelve (12) for three proppant layers. Therefore, substituting the equation (5), (7) and (8) into equation (6), and solving for the pressure at fracture gives the general equation:

$$P = \left\{ \frac{4.46(2.150 v_o)^\alpha}{(1 - 2\nu)} \frac{\sigma_o}{\beta} \left( \frac{(1 - \nu^2)}{E} \right)^{\frac{2-3\alpha}{3}} \frac{1}{r^{3\alpha}} \right\}^{\frac{3}{1+3\alpha}} \quad (9)$$

Figure 2:
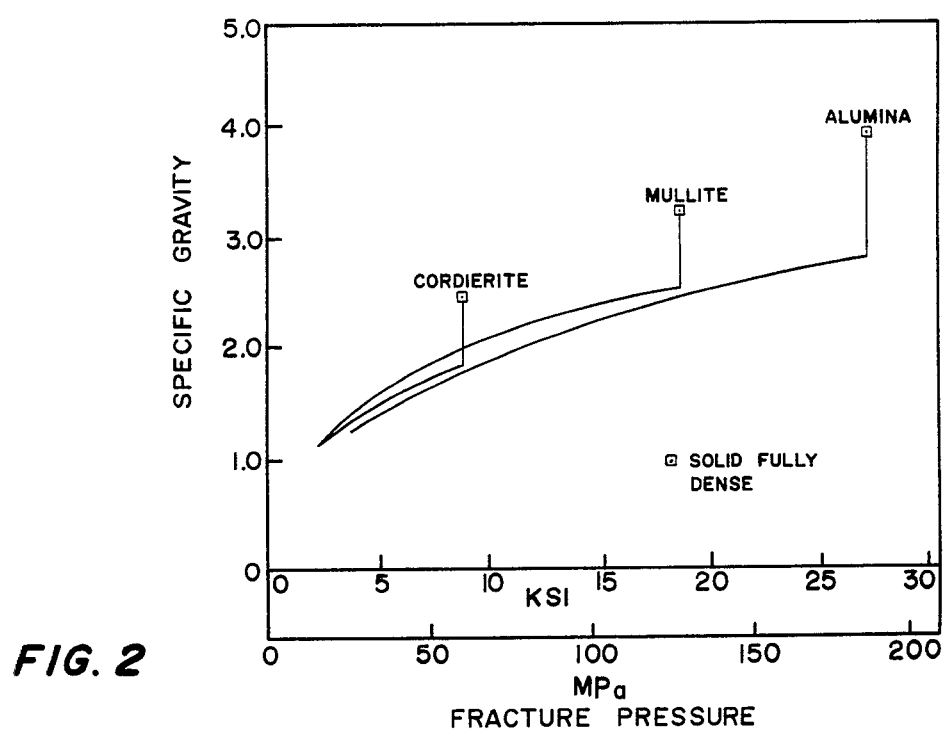
FIG. 2, a graph showing theoretical fracture pressures supported by $-$20, $+$40 mesh hollow ceramic spheres of different materials as a function of increasing void size.

For calculating the fracture pressure of different proppant materials as set out in the graph of FIG. 2 certain assumptions were made. The reference stress, "$\sigma_o$", was assumed to be the bending strength of the material and the reference volume, "$V_o$", is typically 0.01 in.$^3$ for bend tests. The typical vaue of "r" for a 20-40 mesh proppant is approximately 0.0115 in., and a value of 0.1 was assumed for $\alpha$ to give a typical ratio of bend strength to direct tensile strength of 1.5. A value of 0.571 was established for $\beta$ based on literature values for the bend strength, modulus and fracture pressure for glass. A nominal value of 0.25 was assumed for Poissen's ratio.

Changing appropriately the strength and modulus factors in equation (9) provides a formula for calculation of prressure at fracture that takes into account the effect of porosity utilizing equation (9). Therefrom applying an elasticity solution for concentrated loading utilizing a thick wall sphere theory for elastic stiffness that assumes the stress at the inner surface as critical, produces the equations (A) and (B) above.

Applying formula (B), FIG. 2 shows the theoretical fracture pressure for hollow 20-40 mesh ceramic spheres of cordierite, mullite and alumina as compared to fully dense spheres. The graphs show a discontinuity between the hollow and fully dense spheres that can be accounted for on the basis that, with a fully dense solid sphere or hollow sphere with a small central void, the contact zone stresses should be assumed to be controlling. Thus, a center void can be used to decrease the proppant specific gravity without affecting its fracture pressure. However, once a critical void size is exceeded, the limiting stress would then become that of the inside surface and further increases in void size would cause a decrease in the predicted fracture pressure. It is, therefore, important to note that the specific gravity of a proppant may be lowered significantly by fabricating a hollow sphere to a certain volume without any loss in strength. The curves in FIG. 2 predict that the void in the center of the sphere can be up to 25% of the volume without an appreciable loss of strength. As shown therein, with a hollow alumina (99% pure) proppant, the propant's resistance to crushing will not be cut in half until the void reaches 45% of the proppant volume. The same material made with uniform porosity throughout to give the same strength would be over 65% heavier than such hollow proppant. Theoretical predictions show that alumina, bauxite, mullite, cordierite, zirconia and other crystalline ceramic proppants can be made with strengths greater than traditional sand proppants, but with lower specific gravities, by fabricating them as hollow, rather than solid, proppants.

Figure 3:
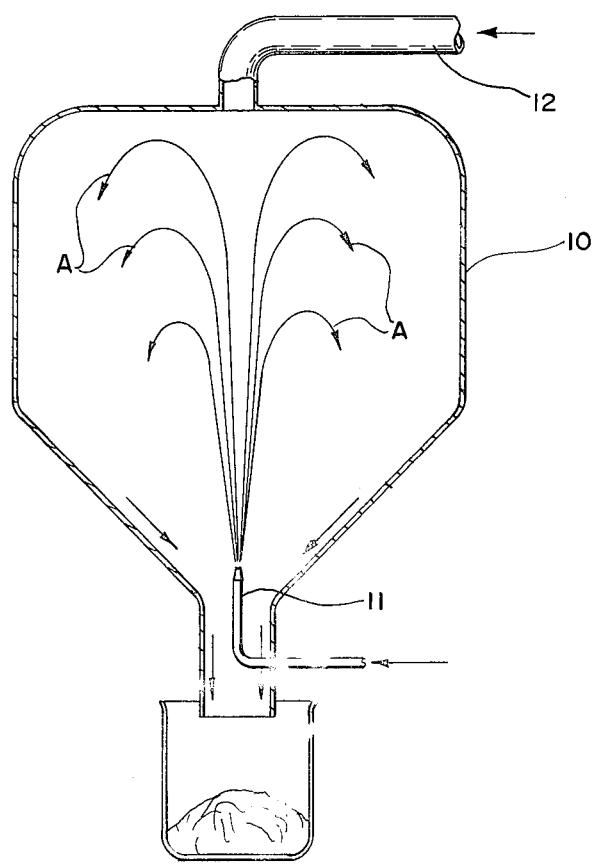
FIG. 3, a schematic representation of a fluid nozzle spray dryer wherein hollow spherical proppants are produced.

FIG. 3 represents a schematic of an apparatus for practicing the process of the present invention for fabricating hollow, crystalline, spherical, ceramic proppants, including a single fluid nozzle spray dryer body 10 that has approximately a 2.1 meter diameter chamber. The spray drying tests using this apparatus wre made with Alcoa A-16 Superground alumina (average diameter less than 1 µm). However, other ceramics including: bauxite, mullite, cordierite, zirconia and porcelains can be fabricated in a similar manner as described in detail with respect to the examples hereinbelow. The hollow spherical proppants were made by mixing the alumina with an aqueous binder and pumping this slurry through a nozzle 11 that is supported longitudinally in the center of a discharge opening in the bottom of the spray dryer body 10. Hot air was introduced therein through an inlet duct 12 arranged in the top of the spray dryer body 10, opposite to nozzle 11. The hot air produces a counter current flow to the nozzle atomized ceramic slurry discharge. This gave the atomized particle more flight time (in comparison to co-current atomization) before they reached the hottest portion of the hot air flow, remaining in the dryer body, shown as arrows A, and then passing through the bottom discharge, as illustrated with straight arrows. The atomized slurry is thereby expanded to form a spherical particle with the organic binder sealing off the surface, causing the sphere to "balloon out" as the increasing temperature expands the trapped air prior to exhaust from the dryer. In this process, by controlling the nozzle discharge rate and hot air flows, the particle time within the dryer can be controlled. The size of the spray dried particle and their wall thickness can thereby be controlled by varying the solids content in the slurry, and the binder type and content in the slurry, the air temperatures, nozzle size, and discharge.

Herein below are set out examples 1-5 and 6-10 that set out in detail and with respect to Tables 1-5 a practice of the process of the invention for producing hollow spherical proppants having a specific gravity of 3.3 gm/cm and lower and having a fracture strength greater than 34.5 MPa or 5,000 psi.

EXAMPLES 1-5

Five slurries, with compositions that are shown in Table 1 herein below, were made by agitating the slurry with Cowles dissolver. Darvan "C" was used to disperse the alumina in water, polyvinyl alcohol (Gelvatol 20-30) was used as a binder, a defoaming agent (DOW DB-31) and polyethylene glycol (Poly "G" 200) were also added to the slurry. A minor addition of soda was added to the fifth batch to see if it would act as a fluxing agent during sintering. The slurry was fed into the Bowen Engineering Spray Dryer through a multi-stage, variable speed, Moyno Pump.

TABLE 1

| Spray Drying Run # | Weight Percent Solids | Weight Percent Based on Alumina | | | | |
|---|---|---|---|---|---|---|
| | | Darvan "C" | Gelvatol 20-30 | Poly "G" 200 | DOW Anti-Foam (DB-31) | Soda Ash |
| 1 | 70.3 | — | 1.00 | 0.51 | 0.16 | — |
| 2 | 75.2 | 0.12 | 0.77 | 0.39 | — | — |
| 3 | 75.2 | 0.12 | 0.77 | 0.39 | 0.16 | — |
| 4 | 73.0 | 0.14 | 0.87 | 0.44 | 0.14 | — |
| 5 | 70.3 | 0.16 | 1.00 | 0.51 | 0.16 | 0.03 |

TABLE 1-continued

Figure 4:
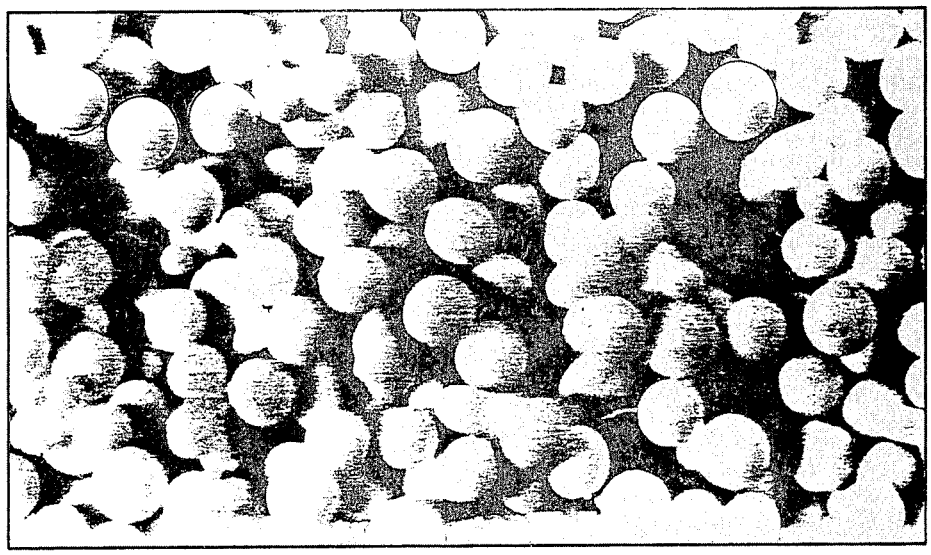
FIG. 4, a representation of a photograph taken at 128$\times$ showing the nearly spherical appearance of spray dried alumina proppants after sintering at 1525° C. for one hour.
Figure 6:
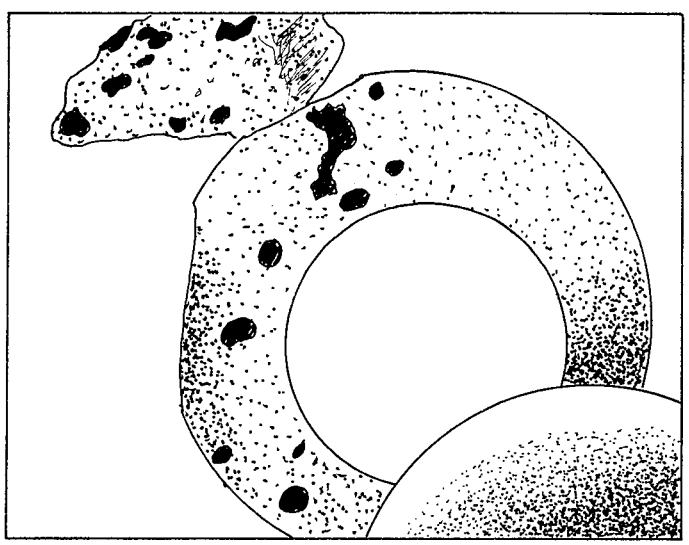
FIG. 6, a representation of a photograph tken at 500× showing the nearly concentric internal void formed in an unsintered alumina spray dried sphere.

Spray drying conditions for each of the five runs are given in Table 2, herein below. Optical micrographs, from the Run No. 1 spheres are shown in FIG. 4 and reveal that the spray dried proppants were spherical in most cases with a sphericity and roundness greater than 0.9 as determined by a Krumbein and Sloss chart. The cut cross-section of an unsintered Run No. 5 sphere, is shown in FIG. 6 and demonstrates that the spray drying produces hollow propants with well formed concentric voids.

TABLE 2

| Spray Drying Run # | Slurry Feed Rate (kg/min) | Air Temperature (°C.) | | Atomizing Pressure (MPa/psi) |
|---|---|---|---|---|
| | | Inlet | Outlet | |
| 1 | 2.7 | 265 | 148 | 0.69/100 |
| 2 | 3.2 | 265 | 148 | 0.69/100 |
| 3 | 3.5 | 265 | 148 | 0.69/100 |
| 4 | 2.5 | 200 | 115 | 0.69/100 |
| 5 | 2.0 | 280 | 153 | 0.69/100 |

Figure 5:
FIG. 5, a representation of a photograph taken at 5300$\times$ of an alumina proppant of FIG. 4 that has been fractured, exposing the small alumina grain size.

The proppants were sintered in air at conditions as specified in Table 3, herein below. A scanning electron micrograph was used to produce FIG. 5 that shows it is possible to get the alumina grains to pack well together during spray drying and shows that the walls of hollow proppants contain fine alumina grains (less than 5 m-. in diameter). These proppants, while many were like the cross-section shown in FIG. 6, many were far from optimized and had multiple voids or non-concentric voids. The strength data presented in Table 3, however, shows that it is possible to make hollow proppants by this method.

TABLE 3

| Example | Green Density (g/cm³) | Loading Pressure (MPa/ksi) | Sintering Conditions | Mesh Size | Sintered Density (g/cm³) | Wt. % Crushed* |
|---|---|---|---|---|---|---|
| #1 | 1.96 | 34.5 (5) | A | D | 2.91 | 10.2, 11.0 |
| | | | | E | 2.83 | 5.6, 6.2 |
| | | | B | D | 2.75 | 20.1 |
| | | | | E | 2.74 | 20.5 |
| | | | C | D | 2.83 | 34.8 |
| | | | | E | 2.99 | 24.7 |
| #2 | 1.77 | 34.5 (5) | A | D | 2.72 | 9.4, 10.0 |
| | | | | E | 2.69 | 5.7, 5.6 |
| | | | B | D | 2.63 | 18.1 |
| | | | | E | 2.64 | 22.1 |
| | | | C | D | 2.68 | 18.6 |
| | | | | E | 2.72 | 11.8 |
| #3 | 1.89 | 68.9 (10) | A | D | 2.79 | 32.0, 31.1 |
| | | 34.5 (5) | A | D | 2.79 | 9.0, 7.6 |
| | | | | E | 2.85 | 5.7, 7.7 |
| | | | B | D | 2.63 | 25.9 |
| | | | | E | 2.75 | 23.4 |
| | | | C | D | 2.71 | 19.4 |
| | | | | E | 2.90 | 18.3 |
| #4 | 1.93 | 34.5 (5) | A | D | 3.07 | 10.5, 9.6 |
| | | | | E | 2.78 | 7.7 |
| | | | B | D | 2.96 | 15.5, 18.7 |
| | | | | E | 2.85 | 21.5 |
| | | | C | D | 3.01 | 14.8 |
| | | | | E | 2.91 | 27.6 |
| #5 | 2.08 | 68.9 (10) | A | D | 2.96 | 31.1 |
| | | 34.5 (5) | A | D | 2.96 | 12.3, 6.2 |
| | | | | E | 3.17 | 4.5 |
| | | | B | D | 2.98 | 18.1 |

TABLE 3-continued

| Example | Green Density (g/cm³) | Loading Pressure (MPa/ksi) | Sintering Conditions | Mesh Size | Sintered Density (g/cm³) | Wt. % Crushed* |
|---|---|---|---|---|---|---|
| | | | | E | 3.17 | 27.0 |
| | | | C | D | 3.13 | 18.4 |
| | | | | E | 3.35 | 23.8 |
| Sand | | 34.5 (5) | | D | 2.65 | 35.0 |
| | | | | E | 2.65 | 33.2 |
| Ottawa Sand | | 68.9 (10) | −20,+40 | 2.65 | 40.0 | |
| Bauxite | | 68.9 (10) | −20,+40 | 3.65 | 0.91 | |

*Uniaxial loading with 2 min. hold. Fines were any material smaller than starting mesh size.
A = 1525° C. - 1 hr (3 hrs above 1500° C.)
B = 1500° C. - 1 hr
C = 1500° C. - 14 hrs
D = −60,+80 mesh
E = −80,+100 mesh In Table 3, equal volumes (equivalent to 4 lb/sq ft sand) of the same size hollow alumina and sand proppants were loaded uniaxially in a round die (25.4 mm diameter). The weight precent crushed was determined by screening the crushed material and dividing the weight of the material below the initial size distribution by the total weight of the sample. As shown, the hollow spray dried proppants showed less crushing at 68.9 MPa (10,000 psi) than a high grade Ottawa sand. The hollow proppants tested had sintered densities between 2.65 and 3.35 gm/cc, while fully dense alumina proppants would have a sintered density greater than 3.9 gm/cc.

EXAMPLES 6–10

To show that spray drying parameters could be altered to control the internal void size, five spray drying runs were made with proppant compositions as shown in Table 4, herein below. The spray drying parameters are given in Table 5, herein below, that produced sintered densities between 1.08 gm/cc to 2.25 gm/cc. The proppants were spherical, as before, but had very thin walls (voids greater than 75% of the volume). The strength of these proppants were lower than a high grade sand. These examples do show, however, that it is possible to vary the wall thickness by altering spray drying parameters (i.e., binder and other additives, air temperature, spray size, nozzle type and solids content).

TABLE 4

| Batch # | Spray Drying Run # | Weight Percent Solids | Weight Percent Based on Alumina | | |
|---|---|---|---|---|---|
| | | | Darvan "C" | Gelvatol 20-30 | Poly "G" 200 |
| 6 | 6,7 | 65.4 | 0.5 | 2.0 | — |
| 7 | 8 | 65.9 | 0.5 | 4.0 | 0.5 |
| 8 | 9 | 65.2 | 0.5 | 1.0 | 0.5 |
| 9 | 10 | 70.2 | 0.5 | 1.0 | 0.5 |

TABLE 5

| Run # | Slurry Feed Rate (kg/min) | Air Temperature (°C.) | | Atomizing Pressure (MPa/psi) |
|---|---|---|---|---|
| | | Inlet | Outlet | |
| 6 | 1.5 | 288 | 170 | 0.62–0.69/90–100 |
| 7 | 2.7 | 288 | 170 | 0.69/100 |
| 8 | 2.4 | 250 | 145 | 0.76/110 |
| 9 | 2.7 | 250 | 145 | 0.76/110 |
| 10 | 2.6 | 265 | 148 | 0.76/110 |

Although the foregoing examples use alumina, it is well known in the ceramic art that bauxite, cordierite, porcelains, zirconia and other ceramic raw materials of a similar character can be processed in a like manner. Though, of course, spray drying parameters would have to be varied slightly due to different raw materials, and hollow proppants can be fabricated from all these materials using the described method. Also, it is well known that spray drying is an economical method of producing large volumes of ceramic powders, and it is therefore apparent that with a practice of the described process, it is possible to inexpensively fabricate large volumes of hollow ceramic proppants.

While the invention has been shown and described herein in a preferred form, it should be understood that it may be embodied in other specific forms without departing from the spirit or essential characteristics thereof. The present embodiment is, therefore, to be considered in all respects as illustrative and is made by way of example only and that variations thereto within the scope of the disclosure, are possible without departing from the subject matter coming within the claims, which claims we regard as our invention. And, all changes which come within the meaning and range of equivalency of the claims are to be embraced therein.

We claim:

1. A hollow ceramic proppant comprising, a polycrystalline ceramic sphere having a dense case with an average grain size of less than thirty (30) μm in diameter, a central void that is greater than five (5) and less than fifty (50) volume percent of the proppant, the proppant having a specific gravity lower than three point three (3.3) gm/cc and a crushing strength equal to or greater than that of Ottowa sand at closure stresses above 34.5 MPa, or five thousand (5,000) psi.

2. A hollow ceramic proppant as recited in claim 1, wherein the proppant has a Krumbein sphericity and roundness of 0.8 and greater.

3. A hollow ceramic proppant as recited in claim 1, wherein the average grain size is less than five (5) μm in diameter.

4. A hollow ceramic proppant as recited in claim 1, wherein the inner void is greater than fifteen (15) volume percent and less than fifty (50) volume percent.

5. A hollow ceramic proppant as recited in claim 1, wherein the specific gravity is less than two point five (2.5) gm/cc.

6. A hollow ceramic proppant as recited in claim 1, wherein the ceramic is alumina.

7. A hollow ceramic proppant as recited in claim 1, wherein the ceramic is bauxite.

8. A hollow ceramic proppant as recited in claim 1, wherein the ceramic is mullite.

9. A hollow ceramic proppant as recited in claim 1, wherein the ceramic is cordierite.

10. A hollow ceramic proppant as recited in claim 1, wherein the ceramic is zirconia.

11. A hollow ceramic proppant as recited in claim 1, wherein the ceramic is porcelain.

12. A process for producing hollow ceramic proppants, including the steps of mixing a fine polycrystalline ceramic powder of particles of sizes less than twenty-five (25) μm in diameter with water and organic binders; injecting the mixture through a nozzle into a spray dryer, wherein, a temperature of between one hundred degress (100°) and four hundred degrees (400°) Centigrade (C) is maintained; passing the injected particles against a hot air flow; and sintering the particles at a sufficient temperature to produce proppant having a dense case with an average grain size of less than thirty (30) μm in diameter, a central void that is greater than five (5) volume percent of the proppant, the proppant having a specific gravity lower than three point three (3.3) gm/cc and a crushing strength equal to or greater than that of Ottowa sand at closure stresses of above 34.5 MPa, or five thousand (5,000) psi.

13. A process for producing hollow ceramic proppants as recited in claim 12, wherein the fine ceramic powder grains are less than 5 m in diameter.

14. A process as recited in claim 12, further including adding a defoaming agent to the slurry prior to injecting it through a nozzle.

15. A hollow ceramic proppant as recited in claim 1, wherein the central void is spherical and concentric with the proppant outer surface.

16. A process as recited in claim 12, wherein the binder is a polyvinyl alcohol.

17. A process as recited in claim 14, wherein the defoaming agent is a polyethylene glycol.

* * * * *